(12) United States Patent
Liu et al.

(10) Patent No.: US 11,279,621 B1
(45) Date of Patent: Mar. 22, 2022

(54) PREPARATION METHOD OF AMPHOTERIC TWO-DIMENSIONAL NANOSHEET

(71) Applicant: Southwest Petroleum University, Chengdu (CN)

(72) Inventors: Rui Liu, Chengdu (CN); Shi Gao, Chengdu (CN); Wanfen Pu, Chengdu (CN); Xing Zhao, Chengdu (CN); Lin Sun, Chengdu (CN); Daijun Du, Chengdu (CN); Yingxue Xu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/408,511

(22) Filed: Aug. 23, 2021

(30) Foreign Application Priority Data

May 28, 2021 (CN) .......................... 202110588399.X

(51) Int. Cl.
*C01B 32/198* (2017.01)
*C09K 8/58* (2006.01)
*B82Y 40/00* (2011.01)
*B82Y 30/00* (2011.01)

(52) U.S. Cl.
CPC .............. *C01B 32/198* (2017.08); *C09K 8/58* (2013.01); *B82Y 30/00* (2013.01); *B82Y 40/00* (2013.01); *C01P 2004/24* (2013.01); *C01P 2006/90* (2013.01)

(58) Field of Classification Search
None
See application file for complete search history.

(56) References Cited

U.S. PATENT DOCUMENTS

2018/0079647 A1* 3/2018 Park ...................... C07C 211/09

FOREIGN PATENT DOCUMENTS

| CN | 102431997 | * | 9/2011 |
| CN | 107619044 | * | 9/2017 |
| CN | 107265451 | * | 10/2017 |
| CN | 108452841 | * | 8/2018 |

OTHER PUBLICATIONS

Machine Translation of CN 107619044 (2017). (Year: 2017).*
McDonald, J.O. S, et al. "The Manufacture of a Highly Toxic Organic Phosphorous Compound". Symposium on Chemical Process Hazards. Instn Chem. Engrs. 107-111. 1960. (Year: 1960).*

* cited by examiner

*Primary Examiner* — Sheng H Davis

(57) ABSTRACT

An amphoteric two-dimensional nanosheet and a preparation method thereof are provided. The amphoteric two-dimensional nanosheet is prepared by the following steps: uniformly dispersing few-layered graphene oxide into toluene and then adding alkylamine coupling agent to a mixture of the few-layered graphite oxide and the toluene for reaction; amine terminated graphite oxide dispersion that has been prepared is fully dispersed in toluene-dimethylformamide mixed solvent, and then, alkyl glycidyl ether is added into the above solution for reaction, so as to obtain the amphoteric two-dimensional nanosheet. The amphoteric two-dimensional nanosheet of the present disclosure can be prepared by modifying two-dimensional graphite oxide, to spontaneously form water-in-oil Pickering emulsion at an oil-water interface, compared with emulsion of conventional surfactants, the present disclosure can effectively stabilize the waterflooding front, improve the sweep volume of waterflooding, have a simple synthesis process for convenient large-scale production, and be widely used in waterflooding development reservoirs.

8 Claims, 3 Drawing Sheets

PREPARATION METHOD OF AMPHOTERIC TWO-DIMENSIONAL NANOSHEET

CROSS-REFERENCE TO RELATED APPLICATION

This application claims priority to Chinese Patent Application No. 202110588399. X, entitled "PREPARATION METHOD OF AMPHOTERIC TWO-DIMENSIONAL NANOSHEET" and filed on May 28, 2021, the content of which is hereby incorporated by reference in its entirety.

BACKGROUND

1. Technical Field

The present disclosure generally relates to a technical field of oilfield chemistry, and especially relates to an amphoteric two-dimensional nanosheet, a preparation method and an application thereof.

2. Description of Related Art

Since the 1890s, China has become a net oil importer in order to meet needs of development. From 2008 to 2020, China's dependence on foreign oil is increased from 47% to 73%, so that it is estimated that a huge gap of the oil is occurred in China by 2030. Therefore, how to accelerate exploration and development of oil resources, increase oil production, alleviate a contradiction between oil supply and demands, and ensure national energy security have become urgent problems to be solved in China. Waterflooding reservoir is a main body of crude oil production in China for a long time both now and in the future. According to a theoretical calculation, an efficiency of waterflooding development increases every 1%, recoverable reserve can increase by about 200 million tons. However, there are many problems in the waterflooding reservoir, such as a large difference of water oil viscosity, a high mobility ratio, and easily being affected by reservoir heterogeneity, etc., which leads to form viscous fingering at a front edge of flooding and reduces the sweep efficiency. In addition, the waterflooding reservoirs are also characterized by large oil/water interfacial tension, high oil/rock interfacial energy (strong oil wettability), large oil adhesion and low micro oil flooding efficiency in water swept area, so that conventional waterflooding development methods are difficult to meet requirements of oil flooding operation under complex conditions. At the same time, domestic oil fields developed by the waterflooding have entered a middle and late stage of development, which is characterized a high water content and a high recovery. In this way, an average recovery rate of the oilfield is only 32%, and approximately two-thirds of subsurface oil reserves are difficult to be recovered by using current waterflooding technologies. Therefore, it is urgent to develop new technologies to effectively improve oil recovery in order to maintain steady oil production.

At present, nano materials with excellent properties and widely used in various fields have gradually attracted the attention of petroleum technology workers. The nano material is referred to a material that at least one-dimensional size in three-dimensional space is in nano-scale. As an important branch of the nano material, nano carbon shows commonness of the nano material, such as quantum effects, small-size effects, surface (Interface) effects, etc., and also shows characteristics of light weight, high mechanical strength and elasticity. In the field of oilfield development, the nano material is also proved to have effects of reducing interfacial tension and changing rock wettability, which can play as a role in reducing pressure and increasing injection during water injection development, and have great potential in enhancing oil recovery. The nano carbon includes zero-dimensional fullerenes, one-dimensional carbon nanotubes, two-dimensional graphene and other low-dimensional nano materials. However, in addition to a fact that the zero-dimensional fullerene is a real water-soluble carbon material, the carbon nanotubes and the graphene are naturally hydrophobic, so that they are difficult to directly play due roles in waterflooding operations. Therefore, improving hydrophilicity of carbon nano materials by chemical modification has naturally become a key to the construction of carbon-based nanofluids for flooding.

SUMMARY

The technical problems to be solved, in view of the shortcomings of the related art, the present disclosure relates to a preparation method of an amphoteric two-dimensional nanosheet which can prepare the amphoteric two-dimensional nanosheet with in-situ fluidity control and cooperative microscopic oil flooding by chemical modification, so that the amphoteric two-dimensional nanosheet can control an interfacial tension of crude oil within an order of $10^{-1}$ mN/m, spontaneously enrich at an oil-water interface after injecting into a formation, and form Pickering emulsion of water-in-oil under a shear induction of water injection flooding, which can significantly increase a number of capillaries in a flooding process, enlarge a sweep volume and improve oil flooding efficiency, thus effectively improving a recovery rate of the crude oil.

Another object of the present disclosure is to provide a preparation method of the amphoteric two-dimensional nanosheet, which has advantages of simple steps, complete reaction and high yield so as to realize mass production.

The preparation method of the amphoteric two-dimensional nanosheet according to the present disclosure includes the following steps:

step (a), uniformly dispersing few-layered graphite oxide into toluene, and adding alkyl amine coupling agent to a mixed solution of the few-layered graphite oxide and the toluene for reaction, so as to prepare amine terminated graphene oxide dispersion;

step (b), uniformly dispersing the prepared amine terminated graphene oxide dispersion into toluene dimethylformamide mixed solvent, and then adding alkyl glycidyl ether to a mixed solution of the prepared amine terminated graphene oxide dispersion and the toluene dimethylformamide mixed solvent for reaction to obtain the amphoteric two-dimensional nanosheet.

Wherein the alkyl amine coupling agent is any one or more combinations of γ-aminopropyl triethoxysilane, N-(β-aminoethyl)-γ-aminopropyl methyl dimethoxy silane, and N-2-(aminoethyl)-3-aminopropyl trimethoxy silane.

Wherein the alkyl glycidyl ether is any one or more combinations of tert-butyl phenyl glycidyl ether, butyl glycidyl ether, octyl glycidyl ether, C12-14 alkyl glycidyl ether and 2-toluene glycidyl ether.

Wherein a layer thickness of the few-layered graphite oxide is 20 nm-1000 nm.

Wherein a specific process of the step (a) is: at a temperature of 65-90° C., uniformly dispersing the few-layered graphite oxide into the toluene, stirring the mixed solution of the few-layered graphite oxide and the toluene for 60 minutes, performing ultrasonic procession on the mixed solution for 30 minutes, and then adding the alkyl amine coupling agent to the mixed solution for reaction for 4-6 hours at the temperature of 65-90° C.; and obtaining the amine terminated graphene oxide dispersion by performing filtration, purification and drying on the mixed solution after the reaction.

Wherein a specific process of the step (b) is: at the temperature of 65-90° C., uniformly dispersing the amine terminated graphene oxide dispersion into a mixed solvent of toluene-dimethylformamide, stirring a mixed solution of the amine terminated graphene oxide dispersion and the mixed solvent of toluene-dimethylformamide for 60 minutes, and then adding the alkyl glycidyl ether to the mixed solution for reaction for 4-6 hours at the temperature of 65-90° C.; and obtaining the amphoteric two-dimensional nanosheet by performing filtration, purification and drying on the mixed solution after the reaction.

Wherein in the step (a), a weight ratio of the few-layered graphite oxide, the toluene and the alkyl amine coupling agent is 6-9:30-60:3-5.

Wherein in the step (b), a weight ratio of the toluene and the dimethylformamide in the toluene-dimethylformamide mixed solvent is 1:1-1.5.

Wherein in the step (b), a weight ratio of the amino terminated graphene oxide dispersion, the toluene-dimethylformamide mixed solvent and the alkyl glycidyl ether is 3-5:15-30:1.2-2.

An amphoteric two-dimensional nano sheet prepared by the above preparation method and an application of the amphoteric two-dimensional nano sheet in reservoir water injection development according to the present disclosure are also provided.

Furthermore, when the amphoteric two-dimensional nanosheet is used for the reservoir water injection development, an interfacial tension between the amphoteric two-dimensional nanosheet and the crude oil reaches an order of $10^{-1}$ mN/m.

The present disclosure provides advantages as below, (1) The amphoteric two-dimensional nanosheet is prepared by a simple method with a reliable principle and high repeatability so that a synthesis process was very simple and convenient for mass production.

(2) The amphoteric two-dimensional nanosheet is directly injected by a water injection system rather than additional injection systems, so that water injection can be produced from water or sewage of the oilfields after simple treatment, which is green, energy-saving and emission reduction.

(3) The two-dimensional amphoteric nanosheet can be enriched at the water-oil interface and self-assembled at the oil-water interface under the shear induction to form the water-in-oil Pickering emulsion, which can effectively stabilize flooding front of the waterflooding, enlarge the sweep volume of the waterflooding and improve the flooding effect.

(4) The amphoteric two-dimensional nanosheet can improve wettability of rocks, change surfaces of oil-wet rocks into neutral wettability or even water-wet surfaces, which can significantly reduce adhesions of the crude oil, and facilitate flooding operations.

(5) The amphoteric two-dimensional nanosheet can significantly increase the number of capillaries in the flooding process, and synergistically upgrade to enlarge the sweep volume and improve the oil flooding efficiency.

(6) The two dimensional amphoteric nanosheet has a wide range of applications so as to be widely used in waterflooding reservoirs.

DETAILED DESCRIPTION

Figure 1:
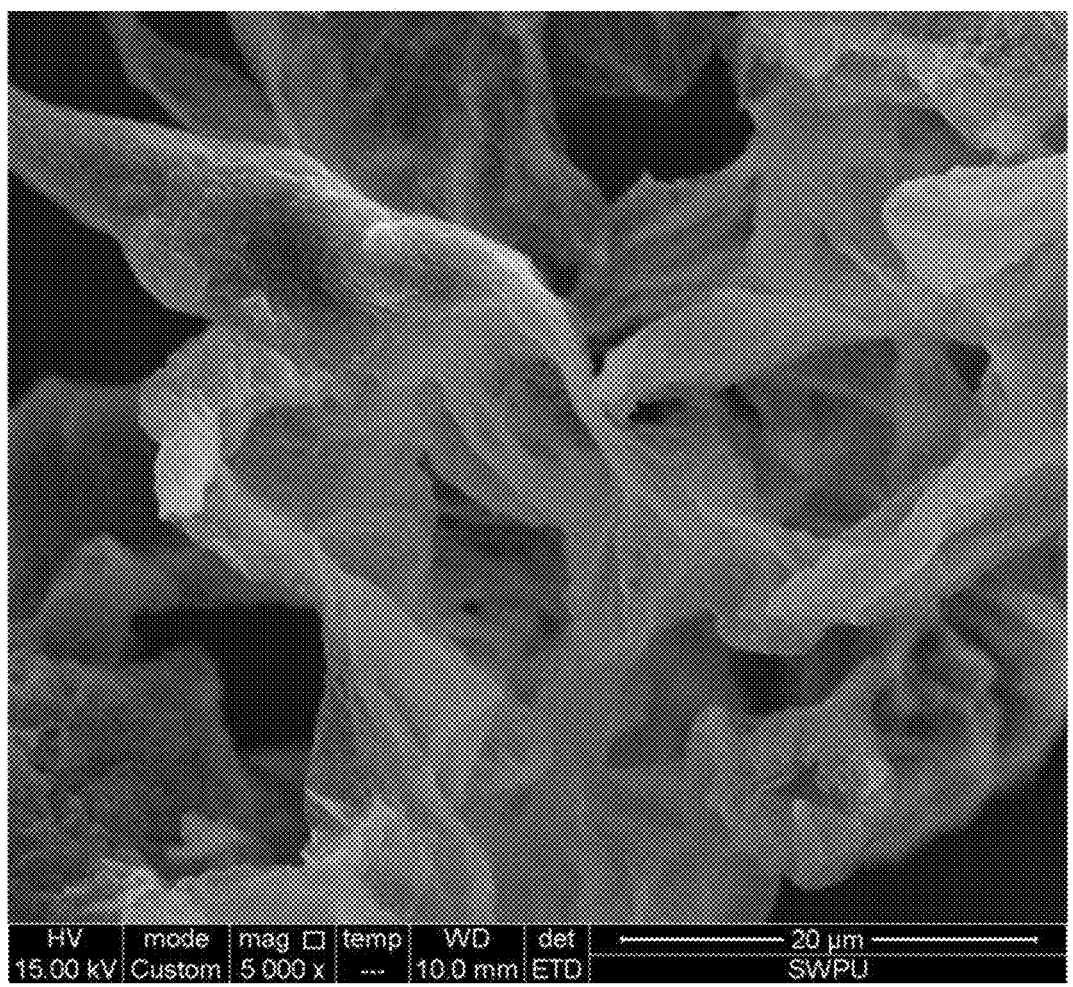
FIG. 1 is a micro morphology view of an amphoteric two-dimensional nanosheet of the present disclosure.

The present disclosure is further described in detail in conjunction with embodiments and accompanying drawings below, but the examples cited are provided only to interpret the present disclosure, but not to limit the scope of the present disclosure.

A First Embodiment

Adding 6 g of few-layered graphite oxide, with a thickness of 20 nm, to a three-necked flask with a 500 mL volume, adding 40 g of toluene in the three-necked flask for stirring for 60 minutes under a water bath temperature of 65° C., so as to fully disperse the few-layered graphite oxide, and then performing ultrasonic procession on a mixture above for 30 minutes; adding 3 g of coupling agent: N-(β-aminoethyl)-γ-aminopropyl methyl dimethoxy silane to the three-necked flask, with the dispersed few-layered graphite oxide, for hermetically stirring under a water bath temperature of 80° C., and then performing a synthetic reaction on the mixture in the three-necked flask for 4 hours under the water bath temperature of 80° C., so as to obtain amine terminated graphene oxide dispersion by performing filtration, purification and drying on the above mixture;

and then, adding 3 g of the amino terminated graphene oxide dispersion that has been prepared to the three-necked flask, and then, adding 20 g of toluene and dimethylformamide solvent (1:1 by weight) in the three-necked flask, and stirring the mixture for 60 minutes under the water bath temperature of 80° C.; adding 1.2 g of tert-butyl phenyl glycidyl ether to the three-necked flask, with the amino terminated graphene oxide dispersion, for hermetically stirring, and obtaining the amphoteric two-dimensional nanosheet by performing filtration, purification and drying on the mixture after performing a reaction on the mixture for 4 hours under the water bath temperature of 80° C.

A Second Embodiment

Adding 8 g of few-layered graphite oxide, with a thickness of 150 nm, to a three-necked flask with a 500 mL volume, adding 50 g of toluene to the three-necked flask for stirring for 60 minutes under a water bath temperature of 70° C., so as to fully disperse the few-layered graphite oxide, and then performing ultrasonic procession on a mixture above for 30 minutes; adding 4 g of coupling agent: γ-aminopropyl triethoxysilane to the three-necked flask, with the dispersed few-layered graphite oxide, under a water bath temperature of 80° C., for hermetically stirring, and then performing a synthetic reaction on the mixture in the three-necked flask for 4.5 hours under the water bath temperature of 70° C., so as to obtain amine terminated graphene oxide dispersion by performing filtration, purification and drying on the above mixture;

and then, adding 3.5 g of the amino terminated graphene oxide dispersion that has been prepared to the three-necked flask, and then, adding 20 g of toluene and dimethylformamide solvent (1:1.2 by weight) in the three-necked flask, and stirring the mixture for 60 minutes under the water bath temperature of 80° C.; adding 1.5 g of butyl glycidyl ether to the three-necked flask, with the amino terminated graphene oxide dispersion under the water bath temperature of 80° C., for hermetically stirring, and obtaining the amphoteric two-dimensional nanosheet by performing filtration, purification and drying on the mixture after performing a reaction on the mixture for 4.5 hours under the water bath temperature of 80° C.

A Third Embodiment

Adding 9 g of few-layered graphite oxide with a thickness of 400 nm, to a three-necked flask with a 500 mL volume, adding 60 g of toluene to the three-necked flask for stirring for 60 minutes under a water bath temperature of 75° C., so as to fully disperse the few-layered graphite oxide, and then performing ultrasonic procession on a mixture above for 30 minutes; adding 4 g of coupling agent: N-2-(aminoethyl)-3-aminopropyl trimethoxy silane to the three-necked flask with the dispersed few-layered graphite oxide under a water bath temperature of 80° C. for hermetically stirring, and then performing a synthetic reaction on the mixture in the three-necked flask for 5 hours under the water bath temperature of 75° C., so as to obtain amine terminated graphene oxide dispersion by performing filtration, purification and drying on the above mixture;

and then, adding 4 g of the amino terminated graphene oxide dispersion that has been prepared to the three-necked flask, and then, adding 30 g of toluene and dimethylformamide solvent (1:1.3 by weight) in the three-necked flask, and stirring the mixture for 60 minutes under the water bath temperature of 85° C.; adding 1.8 g of octyl glycidyl ether to the three-necked flask with the amino terminated graphene oxide, dispersion under the water bath temperature of 85° C., for hermetically stirring, and obtaining the amphoteric two-dimensional nanosheet by performing filtration, purification and drying on the mixture after performing a reaction on the mixture for 5 hours under the water bath temperature of 85° C.

A Fourth Embodiment

Adding 8 g of few-layered graphite oxide with a thickness of 600 nm, to a three-necked flask with a 500 mL volume, adding 50 g of toluene to the three-necked flask for stirring for 60 minutes under a water bath temperature of 80° C., so as to fully disperse the few-layered graphite oxide, and then performing ultrasonic procession on a mixture above for 30 minutes; adding 2 g of γ-aminopropyl triethoxysilane and 2 g of N-2-(aminoethyl)-3-aminopropyl trimethoxy silane to the three-necked flask with the dispersed few-layered graphite oxide under the water bath temperature of 80° C. for hermetically stirring, and then performing a synthetic reaction on the mixture in the three-necked flask for 5.5 hours under the water bath temperature of 80° C., so as to obtain amine terminated graphene oxide dispersion by performing filtration, purification and drying on the above mixture;

and then, adding 3.5 g of the amino terminated graphene oxide dispersion that has been prepared to the three-necked flask, and then, adding 30 g of toluene and dimethylformamide solvent (1:1.4 by weight) in the three-necked flask, and stirring the mixture for 60 minutes under the water bath temperature of 80° C.; adding 2 g of C12-14 alkyl glycidyl ether to the three-necked flask with the amino terminated graphene oxide dispersion under a water bath temperature of 85° C., for hermetically stirring, and obtaining the amphoteric two-dimensional nanosheet by performing filtration, purification and drying on the mixture after performing a reaction on the mixture for 5.5 hours under the water bath temperature of 85° C.

A Fifth Embodiment

Adding 9 g of few-layered graphite oxide with a thickness of 700 nm, to a three-necked flask with a 500 mL volume, adding 56 g of toluene to the three-necked flask for stirring for 60 minutes under a water bath temperature of 80° C., so as to fully disperse the few-layered graphite oxide, and then performing ultrasonic procession on a mixture above for 30 minutes; adding 2.5 g of N-2-(aminoethyl)-3-aminopropyl trimethoxy silane and 2 g of N-(β-aminoethyl)-γ-aminopropyl methyl dimethoxy silane to the three-necked flask with the dispersed few-layered graphene oxide under the water bath temperature of 80° C. for hermetically stirring, and then performing a synthetic reaction on the mixture in the three-necked flask for 6 hours under a water bath temperature of 65° C., so as to obtain amine terminated graphene oxide dispersion by performing filtration, purification and drying on the above mixture;

and then, adding 3.5 g of the amino terminated graphene oxide dispersion that has been prepared to the three-necked flask, and then, adding 30 g of toluene and dimethylformamide solvent (1:1.5 by weight) in the three-necked flask, and stirring the mixture for 60 minutes under the water bath temperature of 80° C.; adding 1.8 g of 2-toluene glycidyl ether to the three-necked flask with the amino terminated graphene oxide dispersion under a water bath temperature of 85° C. for hermetically stirring, and obtaining the amphoteric two-dimensional nanosheet by performing filtration, purification and drying on the mixture after performing a reaction on the mixture for 6 hours under the water bath temperature of 85° C.

A Sixth Embodiment

Adding 9 g of few-layered graphite oxide with a thickness of 800 nm, to a three-necked flask with a 500 mL volume, adding 56 g of toluene to the three-necked flask for stirring for 60 minutes under a water bath temperature of 80° C., so as to fully disperse the few-layered graphite oxide, and then performing ultrasonic procession on a mixture above for 30 minutes; adding 3.5 g of N-2-(aminoethyl)-3-aminopropyl trimethoxy silane to the three-necked flask with the dispersed few-layered graphite oxide under the water bath temperature of 80° C. for hermetically stirring, and then performing a synthetic reaction on the mixture in the three-necked flask for 6 hours under a water bath temperature of 85° C., so as to obtain amine terminated graphene oxide dispersion by performing filtration, purification and drying on the above mixture;

and then, adding 3.5 g of the amino terminated graphene oxide dispersion that has been prepared to the three-necked flask, and then, adding 30 g of toluene and dimethylformamide solvent (1:1.5 by weight) in the three-necked flask, and stirring the mixture for 60 minutes under the water bath temperature of 80° C.; adding 1.0 g of C12-14 alkyl glycidyl ether and 1.0 g of 2-toluene glycidyl ether to the three-necked flask with the amino terminated graphene oxide dispersion under the water bath temperature of 80° C. for hermetically stirring, and obtaining the amphoteric two-dimensional nanosheet by performing filtration, purification and drying on the mixture after performing a reaction on the mixture for 6 hours under the water bath temperature of 85° C.

A Seventh Embodiment

Adding 8 g of few-layered graphite oxide with a thickness of 900 nm, to a three-necked flask with a 500 mL volume, adding 50 g of toluene to the three-necked flask for stirring for 60 minutes under a water bath temperature of 85° C., so as to fully disperse the few-layered graphite oxide, and then performing ultrasonic procession on a mixture above for 30 minutes; adding 1.5 g of γ-aminopropyl triethoxysilane and 1.5 g of N-2-(aminoethyl)-3-aminopropyl trimethoxy silane to the three-necked flask with the dispersed few-layered graphite oxide under the water bath temperature of 85° C. for hermetically stirring, and then performing a synthetic reaction on the mixture in the three-necked flask for 6 hours under the water bath temperature of 85° C., so as to obtain amine terminated graphene oxide dispersion by performing filtration, purification and drying on the above mixture;

and then, adding 3.5 g of the amino terminated graphene oxide dispersion that has been prepared to the three-necked flask, and then, adding 30 g of toluene and dimethylformamide solvent (1:1.5 by weight) in the three-necked flask, and stirring the mixture for 60 minutes under the water bath temperature of 85° C.; adding 1.2 g of tert-butyl phenyl glycidyl ether and 0.8 g of 2-toluene glycidyl ether to the three-necked flask with the amino terminated graphene oxide dispersion under the water bath temperature of 85° C. for hermetically stirring, and obtaining the amphoteric two-dimensional nanosheet by performing filtration, purification and drying on the mixture after performing a reaction on the mixture for 6 hours under a water bath temperature of 90° C.

An Eighth Embodiment

Adding 8 g of few-layered graphite oxide with a thickness of 1000 nm, to a three-necked flask with a 500 mL volume, adding 50 g of toluene to the three-necked flask for stirring for 60 minutes under a water bath temperature of 85° C., so as to fully disperse the few-layered graphite oxide, and then performing ultrasonic procession on a mixture above for 30 minutes; adding 1.5 g of N-(β-aminoethyl)-γ-aminopropyl methyl dimethoxy silane and 1.5 g of N-2-(aminoethyl)-3-aminopropyl trimethoxy silane to the three-necked flask with the dispersed few-layered graphite oxide under the water bath temperature of 85° C. for hermetically stirring, and then performing a synthetic reaction on the mixture in the three-necked flask for 6 hours under the water bath temperature of 85° C., so as to obtain amine terminated graphene oxide dispersion by performing filtration, purification and drying on the above mixture;

and then, adding 4.5 g of the amino terminated graphene oxide dispersion that has been prepared to the three-necked flask, and then, adding 30 g of toluene and dimethylformamide solvent (1:1.5 by weight) in the three-necked flask, and stirring the mixture for 60 minutes under a water bath temperature of 90° C.; adding 0.8 g of octyl glycidyl ether and 1 g C12-14 alkyl glycidyl ether to the three-necked flask with the amino terminated graphene oxide dispersion under the water bath temperature of 90° C. for hermetically stirring, and obtaining the amphoteric two-dimensional nanosheet by performing filtration, purification and drying on the mixture after performing a reaction on the mixture for 6 hours under the water bath temperature of 90° C.

In order to further illustrate technical effects of the present disclosure, relevant characteristics and performance tests of the above mentioned embodiments in practical applications are also provided.

1. Micro-scale characterization of the amphoteric two dimensional nanosheet is shown below.

15 mg of the amphoteric two-dimensional nanosheet prepared in the first embodiment are dispersed in 15 mL of distilled water to obtain dispersion of the amphoteric two-dimensional nanosheet by sealing and stirring a mixture of the amphoteric two-dimensional nanosheet and the distilled water for 5 minutes, and then, micro morphology of carbon-based amphoteric nanoflow in the solution is observed under a nitrogen freezing environment by using an environmental scanning microscope (ESEM), results are shown in FIG. 1.

According to the micro morphology of the environmental scanning microscope (ESEM), a thickness of the amphoteric two-dimensional nanosheet in the first embodiment is about 30 nm, which proves that a two-dimensional plane size of the amphoteric two-dimensional nanosheet can be controlled below a micron level.

2. Critical concentration tests of the amphoteric two-dimensional nanosheet are shown below.

Dispersing the amphoteric two-dimensional nanosheet that is prepared in the sixth embodiment above into distilled water, to prepare dispersion of the amphoteric two-dimensional nanosheet, with different concentrations, and then hermetically stirring above mixtures for 5 minutes, respectively; after that, under an indoor environment, a surface tension instrument is used to test aqueous solutions of the amphoteric two-dimensional nanosheets with different concentrations, by comparing a polygonal-line relationship between the concentration and the surface tension, the concentration that the surface tension of the amphoteric two-dimensional nanosheet decreases significantly is obtained, which is taken as a critical concentration.

Figure 2:
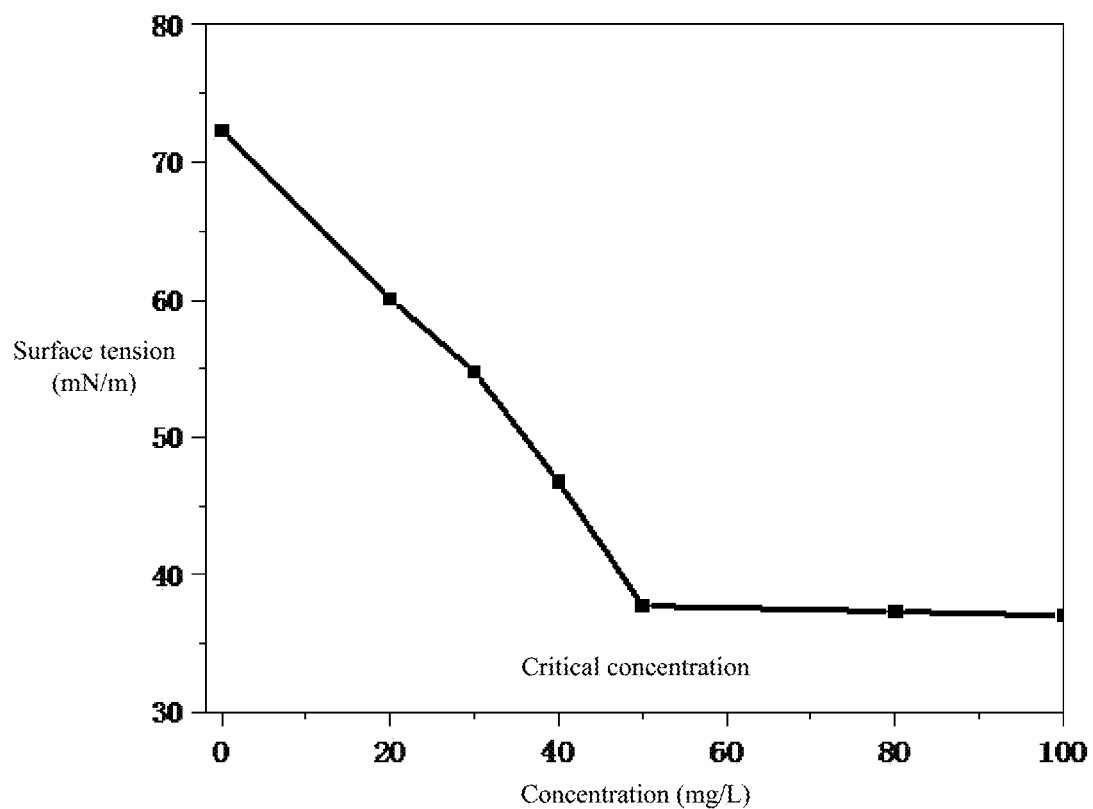
FIG. 2 is a schematic view of a relationship between surface tension and concentration in aqueous solution of the amphoteric two-dimensional nanosheet of the present disclosure.

Test results are shown in FIG. 2. The critical concentration of the amphoteric two-dimensional nanosheet is 45 mg/L, and is significantly lower than a critical micelle concentration of traditional surfactants, which is generally above 100 mg/L. It is indicated that the amphoteric two-dimensional nanosheet has an excellent spontaneous enrichment effect between interfaces, with an interface concentration significantly higher than a solution concentration.

3. Evaluation of the amphoteric two-dimensional nanosheet on reducing oil-water interfacial tension Preparing mineralized water with a salinity of $3.0 \times 10^4$ mg/L (concentrations of $Ca^{2+}$ and $Mg^{2+}$ are respectively $0.06 \times 10^4$ mg/L) and numbering as No. 1 #; Preparing mineralized water with a salinity of $5 \times 10^4$ mg/L (concentrations of $Ca^{2+}$ and $Mg^{2+}$ are respectively $0.15 \times 10^4$ mg/L) and numbering as No. 2 #; preparing mineralized water with a salinity of $7.5 \times 10^4$ mg/L (concentrations of $Ca^{2+}$ and $Mg^{2+}$ are respectively $0.2 \times 10^4$ mg/L) and numbering as No. 3 #; preparing mineralized water with a salinity of $10 \times 10^4$ mg/L (concentrations of $Ca^{2+}$ and $Mg^{2+}$ are respectively $0.5 \times 10^4$ mg/L) and numbering as No. 4 #; preparing mineralized water with a salinity of $15 \times 10^4$ mg/L (concentrations of $Ca^{2+}$ and $Mg^{2+}$ are respectively $0.75 \times 10^4$ mg/L) and numbering as No. 5 #; stirring all the above-mentioned mineralized water for 30 minutes, respectively;

and then, the amphoteric two-dimensional nanosheet that has been prepared in the first embodiment is added to the mineralized water No. 1 #; the amphoteric two-dimensional nanosheet that has been prepared in the second embodiment is added to the mineralized water No. 2 #; the amphoteric two-dimensional nanosheets that have been prepared in the third and fourth embodiments are respectively added to the mineralized water No. 3 #; the amphoteric two-dimensional nanosheets that have been prepared in the fifth and sixth embodiments are respectively added to the mineralized water No. 4 #; the amphoteric two-dimensional nanosheets that have been prepared in the seventh and eighth embodiments are respectively added to the mineralized water No. 5 #. Respectively taking Nos. 1 #-5 # mineralized water as solvent, amphoteric two-dimensional nanosheet dispersions with a mass concentration of 0.05% are prepared and dissolved by stirring for 30 minutes; and then, the stirred amphoteric two-dimensional nanosheet dispersions are evenly divided into two parts, one part isn't aged, the other part is aged at a temperature of 90° C. for 30 days, and the interfacial tension of emulsion obtained after mixing the amphoteric two-dimensional nanosheet dispersion and degassed crude oil (a viscosity is 23.3 mPa·s at a temperature of 50° C. and a shear rate of 10 s$^{-1}$) is measured for 2 hours at the temperature of 50° C., by using a TX500C rotary drop interface tensiometer, so as to obtain stable interfacial tension values of mixed liquid above, and results are as shown in Table 1.

TABLE 1

Stable interfacial tension between amphoteric two dimensional nanosheet solution and crude oil

| Embodiment | Number of mineralized water | Salinity of solution (10$^4$ mg/L) | Oil-water interfacial tension of unaged amphoteric two-dimensional nanosheet (mN/m) | Oil-water interfacial tension of amphoteric two dimensional nanosheet aged at a temperature of 90° C. for 30 days (mN/m) |
|---|---|---|---|---|
| 1 | 1# | 3 | 0.12 | 0.27 |
| 2 | 2# | 5 | 0.31 | 0.39 |
| 3 | 3# | 7.5 | 0.24 | 0.22 |
| 4 | | | 0.18 | 0.29 |
| 5 | 4# | 10 | 0.15 | 0.13 |
| 6 | | | 0.36 | 0.32 |
| 7 | 5# | 15 | 0.41 | 0.56 |
| 8 | | | 0.57 | 0.48 |

As can be seen from Table 1, in the mineralized water with the salinity of 3.015×10$^4$ mg/L, the tension of the oil-water interface between the amphoteric two-dimensional nanosheet and the emulsion which is formed by the amphoteric two-dimensional nanosheet and the crude oil, can be maintained at an order of 10$^{-1}$ mN/m, and interface activity of the amphoteric two-dimensional nanosheet is remained good after being aged for 30 days under a high temperature of 90° C. and a high salinity, and is similar to original interfacial activity, which indicates that the amphoteric two-dimensional nanosheet of the present disclosure has a good effect of reducing the interfacial tension and good temperature resistance and salt resistance.

4. Viscosity characterization of Pickering emulsion formed by the amphoteric two dimensional nanosheet dispersion and the crude oil Dispersing the amphoteric two-dimensional nanosheet that has been prepared in the above-mentioned third embodiment into the mineralized water with the salinity of 7.5×10$^4$ mg/L (concentrations of Ca$^{2+}$ and Mg$^{2+}$ are respectively 0.2×10$^4$ mg/L) and No. 3 # in the above-mentioned characterization process, so as to prepare the amphoteric two-dimensional nanosheet dispersion with a mass concentration of 0.05%, for stirring for 1 hour; and then, preparing a plurality of groups of Pickering emulsions with a total volume of 30 mL by using the amphoteric two-dimensional nanosheet dispersion and the degassed crude oil (the viscosity is 23.3 mPa·s at the temperature of 50° C. and the shear rate of 10 s$^{-1}$) according to volume ratios of water to oil: 2:8, 3:7, 4:6, 5:5, 6:4, 7:3, 8:2, 8.5:1.5 (water contents successively are: 20%, 30%, 40%, 50%, 60%, 70%, 80%, 85%), respectively, and then uniformly mixing a mixture thereof and sealing the mixture; then, emulsification is observed after the mixture is stirred for 30 minutes under an oil bath temperature of 80° C.; After completely stirring, apparent viscosity of the emulsion is measured by a DV-III viscometer at a temperature of 80° C. and the shear rate of 10 s$^{-1}$. The results are shown in Table 2.

TABLE 2

Viscosity of emulsion formed by the amphoteric two-dimensional nanosheet dispersion and the crude oil under different water-oil ratios

| Water-oil ratio (V/V) | Viscosity (mPa · s) |
|---|---|
| 2:8 | 45.1 |
| 3:7 | 75.6 |
| 4:6 | 101.1 |
| 5:5 | 212.4 |
| 6:4 | 304.2 |
| 7:3 | 481.5 |
| 8:2 | 603.9 |
| 8.5:1.5 | 638.7 |

It can be seen from Table 2 that the amphoteric two-dimensional nanosheet in the dispersion can be used as in-situ Pickering emulsion flooding agent, and adsorb on the oil-water interface under a shear induction to form water-in-oil Pickering emulsion, a viscosity of the emulsion is higher than that of the crude oil. At the same time, the emulsion does not change phase within a water content range of 20~85%, which indicates that the formed emulsion can realize intelligent and stable flooding front, thus enlarging the sweep volume and further enhancing an oil recovery rate.

Figure 3:
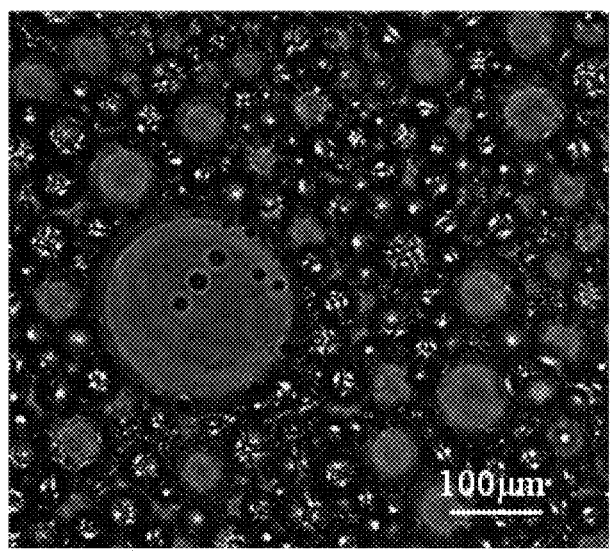
FIG. 3 is a micro morphology view of Pickering emulsion formed by the amphoteric two-dimensional nanosheet at a water-oil interface of the present disclosure.

The micro morphology of the emulsion with a water content of 85% (a volume ratio of the in-situ Pickering emulsion flooding agent to the crude oil is 8.5:1.5) is shown in FIG. 3, surface emulsion still exists in a form of water-in-oil when a water content of the emulsion is up to 85%, and an average particle size is 40 μm. In addition, under a water content with a water-oil ratio greater than 7:3, the in-situ Pickering emulsion formed by inducting the amphoteric two-dimensional nanosheet can increase a viscosity of a flooding phase by 20-30 times of a viscosity of the crude oil, and cooperatively improve surface infiltration of rocks, increase the number of capillaries by more than three orders of magnitude, thus saturation of remaining oil can be effectively reduced after waterflooding.

5. Evaluation of improving wettability of rocks by the amphoteric two-dimensional nanosheet dispersion Dispersing the amphoteric two-dimensional nanosheet that has been prepared in the above-mentioned eight embodiment into the mineralized water with the salinity of $10\times10^4$ mg/L (concentrations of $Ca^{2+}$ and $Mg^{2+}$ are respectively $0.5\times10^4$ mg/L) and No. 4 # in the above-mentioned characterization process, for stirring for 1 hour, so as to prepare the amphoteric two-dimensional nanosheet dispersion with a mass concentration of 0.08%, and evenly dividing the amphoteric two-dimensional nanosheet dispersion into two parts; and then, natural lipophilic core slices 8-1 and 8-2 are selected to be immersed in the two groups of amphoteric two-dimensional nanosheet solutions obtained by equal distribution, keeping the amphiphilic two-dimensional nanosheet dispersion in contact with the core slice under a sealing condition of 90° C., measuring contact angles of solid phase, water phase and oil phase of the two groups of core slices in contact with the amphiphilic two-dimensional nanosheet dispersions at different times by using a DSA100 droplet interfacial tension meter, and results are shown in Table 3.

TABLE 3

Modification of rock wettability by the amphoteric two-dimensional nanosheet

| Rock number | Initial contact angle | Test time |  |  |  |  |
|---|---|---|---|---|---|---|
|  |  | 1 d | 3 d | 5 d | 7 d | 14 d |
|  |  | Contact angle |  |  |  |  |
| 8-1 | 136.2° | 118.4° | 97.5° | 83.4° | 77.2° | 76.1° |
| 8-2 | 82.3° | 79.2° | 70.2° | 65.7° | 64.2° | 63.8° |

Rocks with the contact angles greater than 90° are lipophilic, while, rocks with the contact angles less than 90° are hydrophilic. It can be seen from Table 3 that, with the passage of time, dispersant formed by the amphoteric two-dimensional nanosheet can gradually infiltrate on a surface of the core to be tested, so that a surface of the lipophilic core can be modified to a hydrophilic surface, which reduces lipophilicity of the core surface and improves the flooding effect.

6. Evaluation of synergistic effect of the amphoteric two dimensional nanosheet and the surfactant Taking a certain weight of the mineralized water groups NOs. 1 #-5 # with a gradient salinity being prepared in the above-mentioned characterization process, and evenly dividing the mineralized water No. 1 # into two parts, one is numbered as No. 1 #-1, the other is numbered as No. 1 #-2, and so on, so as to obtain the mineralized water group of the remaining four groups with equal distribution, with the same numbering rules as that of No. 1 #. And then, adding 0.25% by weight of commercial sodium dodecylbenzene sulfonate to the mineralized water No. 1 #-1, adding 0.25% by weight of commercial sodium dodecylbenzene sulfonate to the mineralized water No. 2 #-1, adding 0.25% by weight of commercial alpha-olefin sulfonate to the mineralized water No. 3 #-1, adding 0.25% by weight of commercial alpha-olefin sulfonate to the mineralized water No. 4 #-1, adding 0.25% by weight of commercial dodecyl glucoside to the mineralized water No. 5 #-1, and then respectively stirring the above mineralized water for 30 minutes;

Then, taking solutions Nos. 1 #-2, 2 #-2, 3 #-2, 4 #-2, and 5 #-2 as contrast experimental groups, adding 0.2% by weight of commercial sodium dodecylbenzene sulfonate and 0.05% of amphoteric two-dimensional nanosheets synthesized in the first embodiment to the solution No. 1 #-2; adding 0.2% by weight of commercial sodium dodecylbenzene sulfonate and 0.05% of amphoteric two-dimensional nanosheets synthesized in the second embodiment to the solution No. 2 #-2; adding 0.2% by weight of commercial alpha-olefin sulfonate and 0.05% of amphoteric two-dimensional nanosheets synthesized in the third embodiment to the solution No. 3 #-2; adding 0.2% by weight of commercial alpha-olefin sulfonate and 0.05% of amphoteric two-dimensional nanosheets synthesized in the fourth embodiment to the solution No. 4 #-2; adding 0.2% by weight of commercial dodecane glycoside and 0.05% of amphoteric two-dimensional nanosheets synthesized in the fifth embodiment to the solution No. 5 #-2, and then respectively stirring the above solutions for 30 minutes. The interfacial tension of each above group of dispersions mixed with the degassed crude oil (the viscosity is 23.3 mPa·s at the temperature of 50° C. and the shear rate of 10 $s^{-1}$) is measured for 2 hours at the temperature of 50° C., by using a TX500C rotary drop interface tensiometer, results are as shown in Table 4.

TABLE 4

Stable interfacial tension of a complex system

| Number of preparing mineralized water | Stable oil-water interfacial tension (mN/m) |
|---|---|
| 1#-1 | 0.066 |
| 1#-2 | 0.0054 |
| 2#-1 | 0.041 |
| 2#-2 | 0.0087 |
| 3#-1 | 0.033 |
| 3#-2 | 0.012 |
| 4#-1 | 0.026 |
| 4#-2 | 0.0014 |
| 5#-1 | 0.078 |
| 5#-2 | 0.0069 |

As can be seen from Table 4, when the surfactant is separately applied to the mineralized water with a range of $3.0\sim15\times10^4$ mg/L, the interfacial tension between oil and water can be stabilized at an order of $10^{-2}$ mN/m after the surfactant is mixed with the crude oil. When the surfactant is combined with the amphoteric two-dimensional nanosheet of the present disclosure, a lower interfacial tension can be obtained, even most of the interfacial tensions can be as low as an order of magnitude of $10^{-3}$ mN/m. The above results are indicated that good synergistic properties can be obtained by combing the amphoteric two-dimensional nanosheet and the surfactant, so that the interfacial tension of the crude oil can be effectively reduced and recovery performance can be improved relative to separately using the surfactant.

7. Evaluation of Improving Recovery Rates of the Amphoteric Two-Dimensional Nanosheet Preparing the mineralized water with the salinity of $7.5\times10^4$ mg/L (concentrations of $Ca^{2+}$ and $Mg^{2+}$ are respectively $0.3\times10^4$ mg/L) and evenly dividing the mineralized water with the salinity of $7.5\times10^4$ mg/L into two parts. One part is added with the amphoteric two-dimensional nanosheet synthesized in the third embodiment so as to prepare the amphoteric two-dimensional nanosheet dispersion with a mass fraction of 0.15%; the other part is added with commercial graphene oxide (GO) and petroleum sulfonate (KPS) successively to prepare GO/KPS dispersion with a mass fraction of 0.3% (a concentration of the GO is 0.15% and a concentration of the KPS was 0.15%), and then slowly stirring the solution above for 30 minutes to be dissolved and left standing for 24 hours so as to be taken as the contrast experimental group.

After that, two artificial double-layer heterogeneous long cores with specifications of 45×45×300 mm are made and respectively numbered as No. 1 # and No. 2 #, with gas permeability of 100/600 mD, and porosity of 17.4% and 18.2%, respectively. Under an experimental temperature of 80° C., the two cores are saturated with the crude oil that a viscosity of the crude oil is 19.2 mPa·s. Original oil saturations of the two cores are controlled at about 63%, and parallel waterflooding experiments are carried out on the saturated cores.

Figure 4:
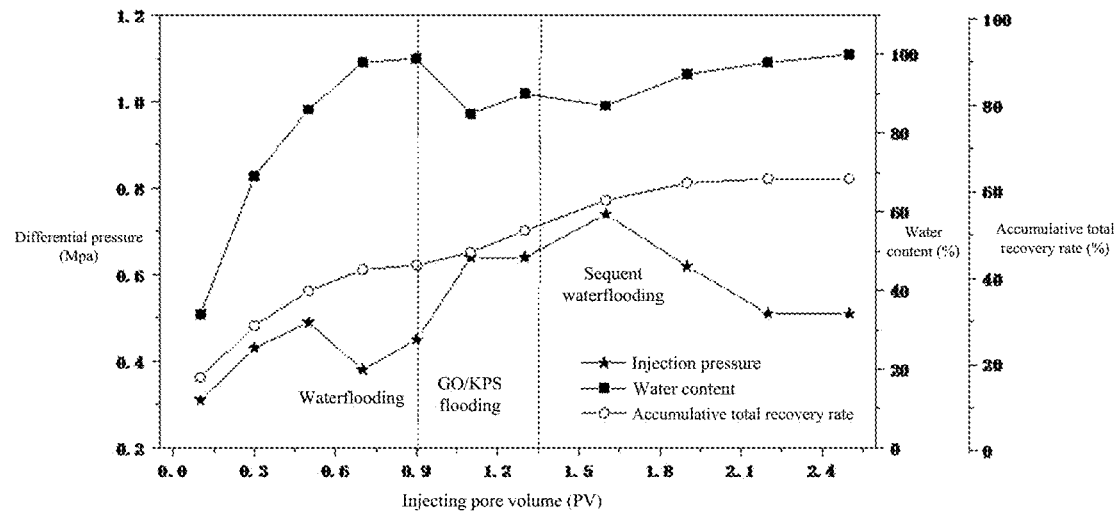
FIG. 4 is a schematic view of oil flooding effects of a mixture dispersion that is mixed by graphene oxide and petroleum sulfonate of the present disclosure.

In the waterflooding, the core No. 1 # is injected with water at a speed of 1.2 mL/min. An effect of the waterflooding is limited due to an unfavorable water oil mobility ratio. When a water content of produced fluid is 98%, a recovery rate thereof is between 43-46%. After that, the GO/KPS dispersion is injected for the waterflooding. After 0.4 PV of GO/KPS dispersion is injected, the GO/KPS dispersion is replaced by ordinary water for the waterflooding again until the water content of the produced liquid reaches 98%, specific flooding effects are shown in FIG. 4. It can be seen that when GO/KPS dispersion is used for the waterflooding, an injection pressure increases and the oil begins to flow out again at an outlet thereof, which indicates that the GO/KPS dispersion can enlarge the sweep volume by regulating the GO and washing the oil via the KPS, so as to improve oil flooding efficiency. 0.4 PV of the GO/KPS dispersion and a subsequent waterflooding can improve the oil recovery rate of about 20%, and a cumulative total oil recovery rate can reach 63.2%.

Figure 5:
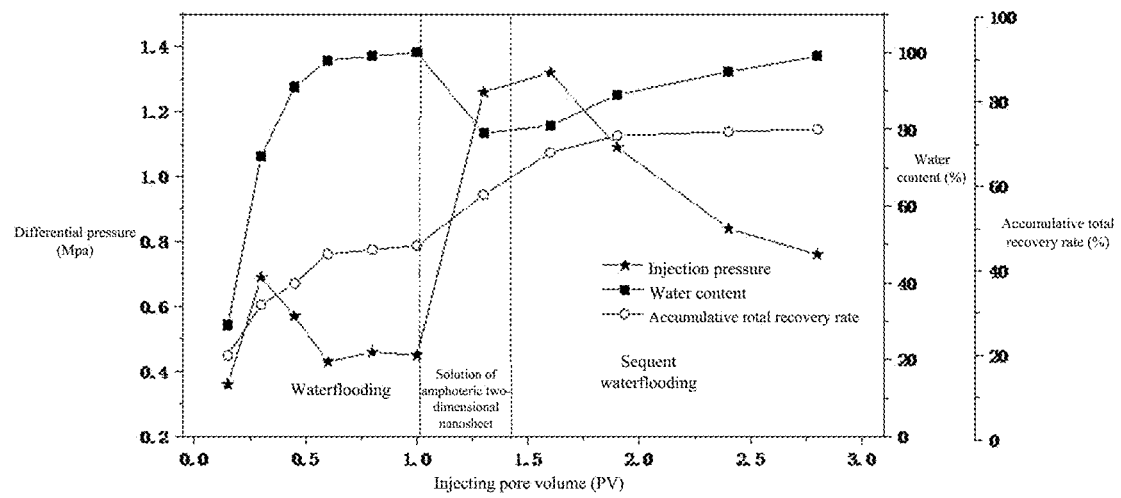
FIG. 5 is a schematic view of oil flooding effects of the amphoteric two-dimensional nanosheet dispersion of the present disclosure.

For the core No. 2 #, after the water content of the produced fluid reaches 98%, 0.4 PV of the amphoteric two-dimensional nanosheet dispersion is injected for the waterflooding, and the flooding effect is shown in FIG. 5. As can be seen from FIG. 5, after injecting 0.4 PV of the amphoteric two-dimensional nanosheet dispersion and completing the subsequent waterflooding, the recovery rate of the crude oil can be increased about 25%, so that the cumulative total oil recovery rate can be up to 73%, which is proved that the in-situ amphoteric two-dimensional nanosheet can spontaneously enrich on the oil-water interface, adsorb on the oil-water interface under a shear induction of formations to form the Pickering emulsion with good viscosity, and keep the emulsion stable under an condition of water content, so as to intelligently control fluidity of the oil-water interface and stabilize the flooding front. Furthermore, the interfacial tension between the amphoteric two-dimensional nanosheet and the crude oil can reach the order of $10^{-1}$ mN/m, at the same time, surface lipophilic property of rocks can be improved, the adhesion of the crude oil is reduced, and finally the flooding efficiency is improved.

Furthermore, comparing FIG. 4 with FIG. 5, the subsequent waterflooding recovery rate of the amphoteric two-dimensional nanosheet dispersion is about 5% higher than that of the GO/KPS dispersion, and the cumulative total recovery rate is about 9% higher than that of the GO/KPS dispersion, which is indicated that the amphoteric two-dimensional nanosheet dispersion can effectively control micro oil flooding, and has a better oil recovery rate relative to conventional GO/KPS flooding fluid systems.

The above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure.

What is claimed is:

1. A preparation method of an amphoteric two-dimensional nanosheet comprising the following steps:
    step (a), in parts by weight, uniformly dispersing 6-9 parts of few-layered graphite oxide into 30-60 parts of a first solvent, performing ultrasonic procession on a mixed solution of the few-layered graphite oxide and the first solvent for 30 minutes; adding 3-5 parts of alkylamine coupling agent to the mixed solution for reaction for 4-6 hours at a temperature of 65-90° C.; and after the reaction of the few-layered graphite oxide with the alkylamine coupling agent is completed, performing filtration, purification and drying to obtain an amine terminated graphene oxide dispersion;
    step (b), uniformly dispersing 3-5 parts of the amine terminated graphene oxide dispersion into 15-30 parts of a second solvent, wherein the second solvent is formed by mixing toluene and dimethylamide with a weight ratio of 1:1-1.5; adding 1.2-2 parts of alkyl glycidyl ether to the solution of the amine terminated graphene oxide dispersion and the second solvent for reaction for 4-6 hours at the temperature of 65-90° C.; and obtaining the amphoteric two-dimensional nanosheet by performing filtration, purification and drying on the mixture of the amine terminated graphene oxide dispersion, the second solvent and the alkyl glycidyl ether after the reaction.

2. The method as claimed in claim 1, wherein the alkyl amine coupling agent is one or more combinations of γ-aminopropyl triethoxysilane, N-(β-aminoethyl)-γ-aminopropyl methyl dimethoxy silane, and N-2-(aminoethyl)-3-aminopropyl trimethoxy silane.

3. The method as claimed in claim 1, wherein the alkyl glycidyl ether is one or more combinations of tert-butyl phenyl glycidyl ether, butyl glycidyl ether, octyl glycidyl ether and C12-14 alkyl glycidyl ether.

4. The method as claimed in claim 1, wherein the first solvent is toluene.

5. The method as claimed in claim 1, wherein a layer thickness of the few-layered graphite oxide is 20 nm-1000 nm.

6. The method as claimed in claim 1, wherein in the step (a) of uniformly dispersing 6-9 parts of the few-layered graphite oxide into 30-60 parts of the first solvent, a temperature of the few-layered graphite oxide dispersing in the first solvent is 65-90° C., and a duration of the few-layered graphite oxide dispersing in the first solvent is 60 minutes.

7. The method as claimed in claim 1, wherein in the step (b) of uniformly dispersing 3-5 parts of the amine terminated graphene oxide dispersion into 15-30 parts of the second solvent, a temperature of the amine terminated graphene oxide dispersion dispersing in the second solvent is 65-90° C., and a duration of the amine terminated graphene oxide dispersion dispersing in the second solvent is 60 minutes.

8. An amphoteric two-dimensional nanosheet prepared by the preparation method as claimed in claim 1.

* * * * *